Figure 1:
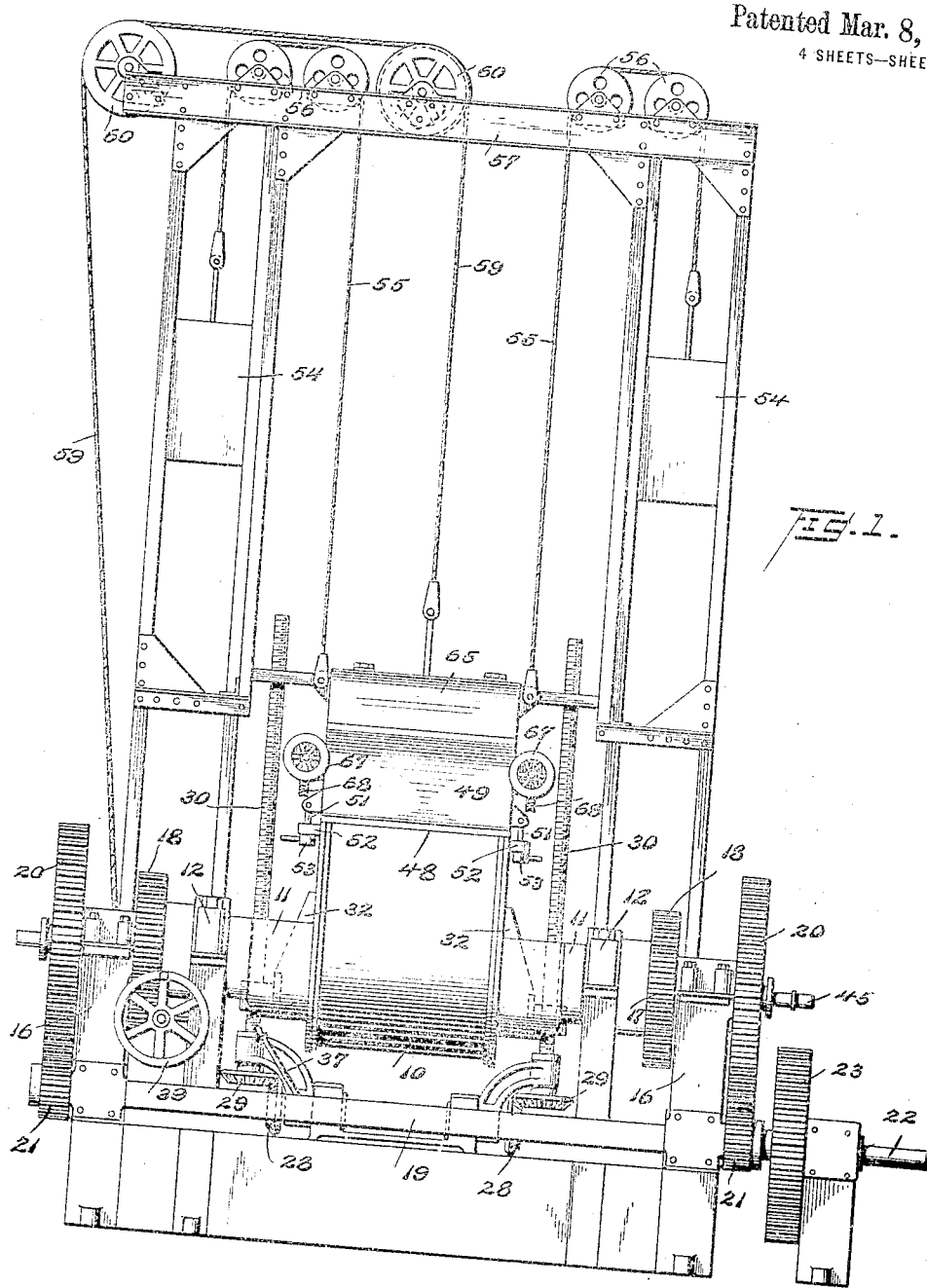

C. C. MOSHER.
RUBBER MASTICATOR.
APPLICATION FILED MAR. 24, 1920.

1,371,046.

Patented Mar. 8, 1921.
4 SHEETS—SHEET 1.

Inventor
Clifford C. Mosher
By Howard A. Coombs
Attorney

C. C. MOSHER.
RUBBER MASTICATOR.
APPLICATION FILED MAR. 24, 1920.
1,371,046.
Patented Mar. 8, 1921.
4 SHEETS—SHEET 2.
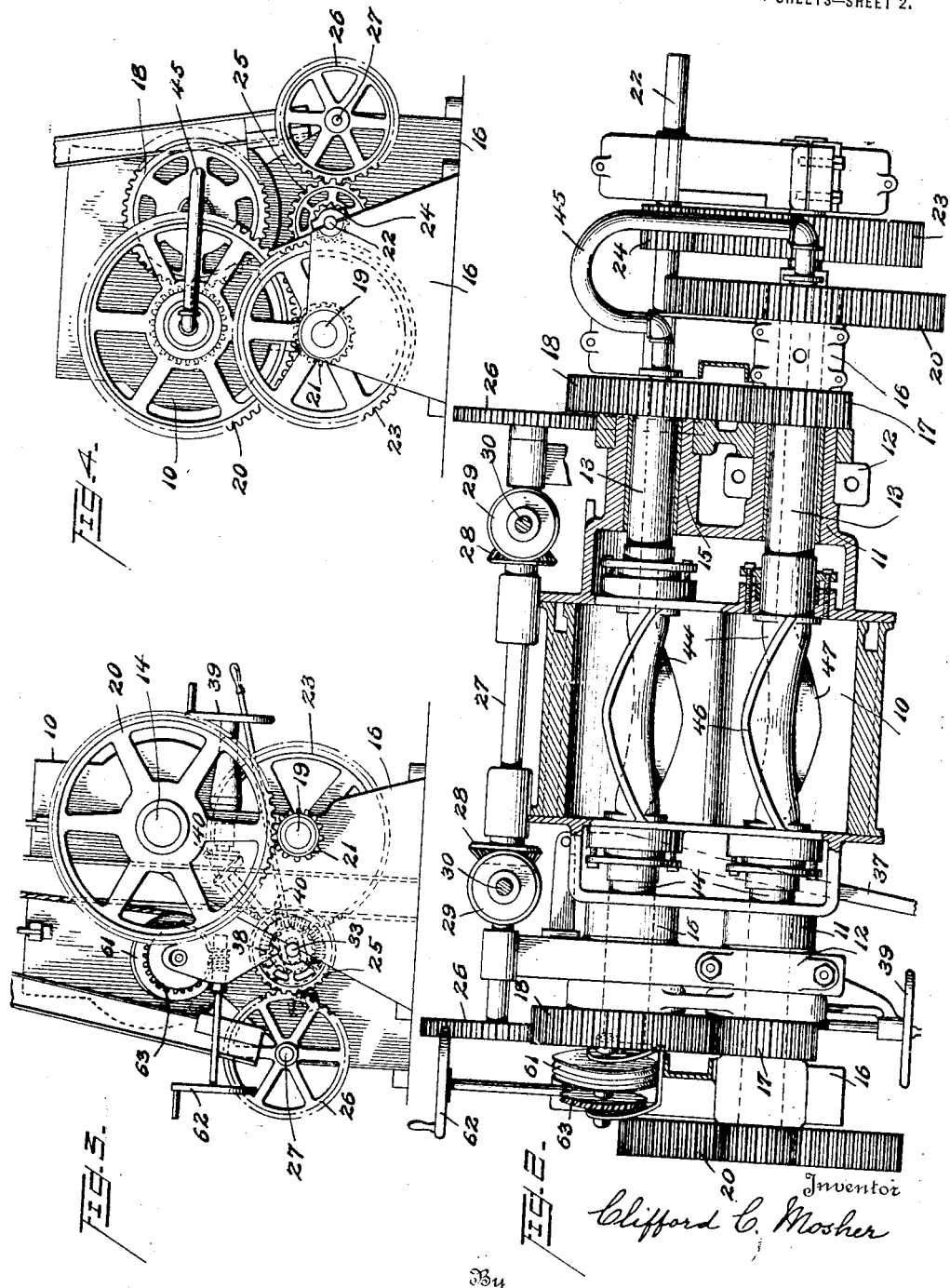
Inventor
Clifford C. Mosher
By Howard A. Coombs
Attorney

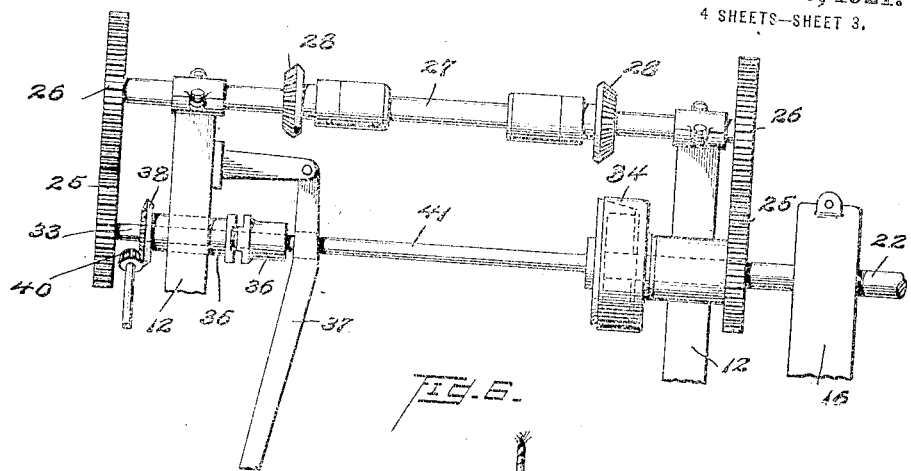
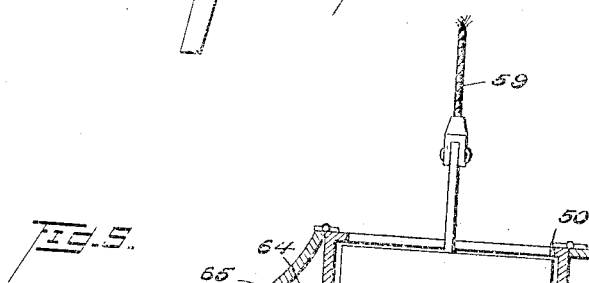
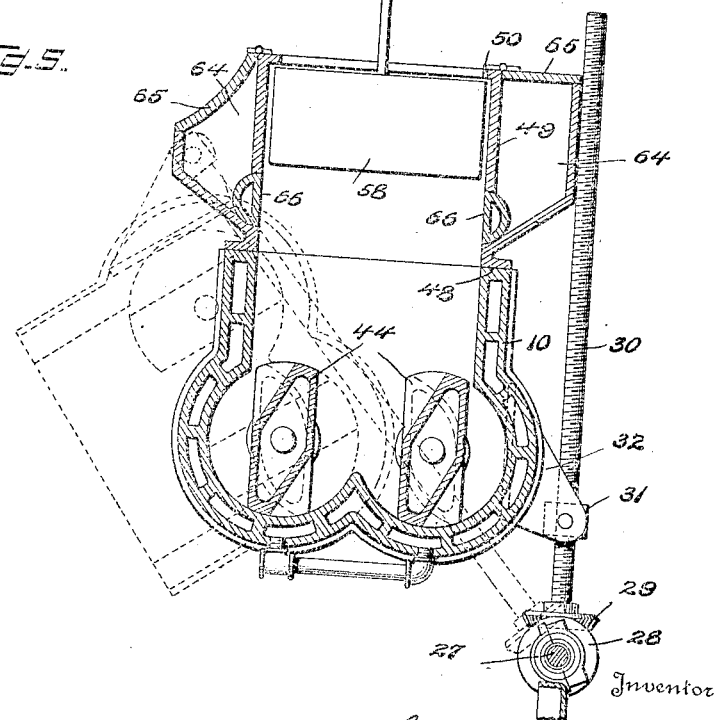

C. C. MOSHER.
RUBBER MASTICATOR.
APPLICATION FILED MAR. 24, 1920.
1,371,046.
Patented Mar. 8, 1921.
4 SHEETS—SHEET 4.
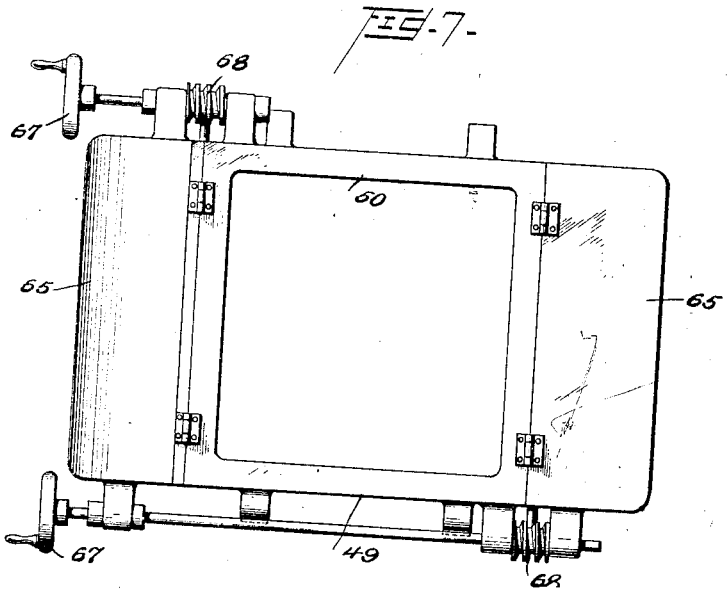
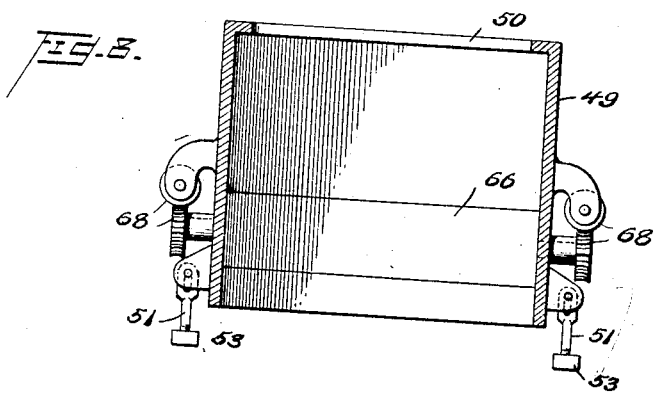
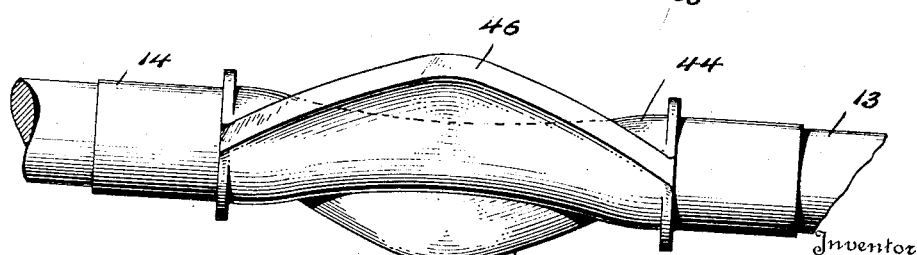
Inventor
Clifford C. Mosher
By Howard A. Coombs
Attorney

UNITED STATES PATENT OFFICE.

CLIFFORD C. MOSHER, OF LIMA, OHIO.

RUBBER-MASTICATOR.

1,371,046.  Specification of Letters Patent.  Patented Mar. 8, 1921.

Application filed March 24, 1920. Serial No. 368,220.

*To all whom it may concern:*

Be it known that I, CLIFFORD C. MOSHER, a citizen of the United States, residing at Lima, in the county of Allen and State of Ohio, have invented new and useful Improvements in Rubber-Masticators, of which the following is a specification.

This invention relates to mixing machines for kneading and mixing any plastic materials and consists in the features of construction and operation hereinafter described in detail.

The machine illustrated in the drawing is known as a rubber masticator and is equipped with mixing blades or agitators of a special form which gives a pulling action on the material in addition to the kneading, cutting and rubbing actions. Another special feature of the machine is the means employed to close the trough during the mixing operation, said means permitting the feeding of powdered material, such as lampblack for example, into the trough while the mixing is going on without danger of the dust being thrown out into the surrounding air.

The features of novelty will be specified in the claims and will now be explained in connection with the accompanying drawing, in which Figure 1 is a front elevation; Fig. 2 a horizontal section; Fig. 3 an end view looking from the left in Figs. 1 and 2; Fig. 4 an end view looking from the right in said views; Fig. 5 a vertical section through the trough and its closure; Fig. 6 a plan of part of the driving gear; Fig. 7 a plan of the trough closure; Fig. 8 a vertical section of the box portion of said closure, and Fig. 9 an elevation of the agitator.

In these views, 10 is the trough having trunnions 11 cast integral therewith and which are journaled in bearings 12 in the frame. The trough ends carry bearings for the agitator shafts 13 and 14, stuffing boxes being provided to prevent leakage through said bearings. One of the shafts, as 13, passes through the trough trunnions, and the other, 14, through the similar shaped part 15, which is not itself journaled in any bearing but can swing in an arc about the axis of shaft 13 and trunnion 11. Shaft 13 is further journaled in outboard bearings 16 and carries outside said bearings the pinions 17 which serve to drive the other agitator shaft 14 through gears 18 on the outer ends of the latter.

Shaft 13 is driven from a countershaft 19, journaled in the frame directly beneath it, through two pairs of gears 20, 21, on the ends of said shafts respectively, and shaft 19 is driven from the power shaft 22 through gear 23, 24. Another gear 25 on the power shaft drives through gear 26 the tilting shaft 27, journaled at the rear of the machine and carrying two bevel gears 28, which drive like gears 29 on the tilting screws 30, mounted to swing about the axis of shaft 27 and engaging nuts 31, pivoted to brackets 32 on the rear of the trough. This form of tilting mechanism is not specifically new, forms no part of applicant's invention and need not be further described in detail.

An extension 33 of the power shaft 22 is connectible thereto through a friction clutch 34 and carries a similar gear 25, meshing with another gear 26 on the tilting shaft; when clutch 34 is in, both pairs of gears 25, 26, act to drive shaft 27 and, when the clutch is out, one of the pairs of gears is used to transmit manual power to said shaft, said manual power being transmitted through a sleeve 35, which is clutched to extension shaft 33 by a jaw clutch 36, operated by hand lever 37, and which sleeve carries a bevel gear 38, driven from hand wheel 39 through the bevel transmission 40. A rod 41 connects the friction and jaw clutches so that when one is engaged, the other is disengaged. Thus the tilting shaft is power driven at each end and manually driven from one end.

The agitator shafts 13, 14, are hollow to convey steam, or other heating or cooling fluid, to the hollow agitators 44, 44, a pipe 45 connecting said shafts at one end, as shown in Fig. 2.

Each agitator 44 is a hollow casting having diametrically opposite blades tapering in thickness toward their outer edges and each blade being concaved on one side and convexed on the other reversely to the other blade, as appears in Fig. 9, in which 46 represents the upper half or blade of the agitator 44, and 47 the lower half or blade.

We now come to the means employed for closing the trough and for feeding ingredients into it during the mixing operation. The open top of the trough is rectangular in shape and provided with the plane surface 48. A cast iron box 49, open at top and bottom with an internal flange 50 at the top, fits onto said surface, the interior dimensions of said box being the same as those of the top of the trough. The lower end of the box carries pivoted bolts 51, which engage in slotted lugs 52 of the trough, the hand nuts 53 on said bolts serving to tightly clamp the box in place. Counterweights 54 are connected to the box by cables 55, running over sheaves 56 in the top-frame 57.

Within the box is snugly fitted, to slide therein, a weight 58, to which is secured one end of a cable 59, running over sheaves 60 in said top-frame, and connected at its other end to a winding drum 61, driven from a hand wheel 62 through worm gearing 63, see Figs. 2 and 3. After the box is tightly clamped onto the trough, the weight is lowered more or less to create the desired amount of pressure in the trough as well as preventing any material from flying out. To introduce powdered ingredients, such as lamp-black, while the agitators are running, the box is provided on each side with a hopper compartment 64, closed by a cover 65 and communicating with the box near the bottom thereof. The communicating openings between the hopper compartments and the box are controlled by the rotary valves 66, actuated from the hand wheels 67 through the worm gearing 68.

When the mix is complete, the bolts holding the box on the trough are released and the winding drum is rotated to raise the weight which, engaging the internal flange at the top of the box, takes the latter with it to the elevation necessary to permit the trough to be tilted to discharge its contents.

Top-frame 57 is built onto the frame of the machine so as to form an integral part thereof, so that no outside supports are required and the entire machine is self-contained. The box and weight closure for the trough is a particularly valuable feature in machines of this kind, keeping the mix under a certain pressure and preventing any ingredients being thrown out into the air, and permitting the proper amounts of powdered ingredients to be added during the mix without any loss thereof or any contamination of the atmosphere, which have heretofore caused much difficulty and inconvenience, as well as injury to health, in the operation of rubber masticating machines.

It will be apparent that some of the features of this machine are adapted for use in other types of mixing machines and that the machine illustrated and described is used by way of example only as showing one embodiment of my invention.

Having thus described my invention, what I claim is:

1. A mixing machine comprising a trough having a pair of integral journals projecting from each side thereof, one of said pair constituting trunnions on which the trough can be tilted, shafts within said bearings carrying agitator blades within the trough, gearing connecting said shafts, and a driving shaft geared to the shaft within the trunnions.

2. A mixing machine comprising a trough having a pair of bearings on each side, one of each pair also forming a trunnion on which the trough can be tilted, shafts within said bearings, agitators on said shafts within the trough, two pairs of gears connecting said shafts, a parallel driving shaft, two pairs of gears connecting said driving shaft to the shaft within the trunnions, means to tilt the trough and connections from said driving shaft to said means.

3. A mixing machine comprising a trough having a pair of bearings projecting from each side, one of each pair constituting a trunnion about which the trough can be tilted, hollow shafts journaled in said bearings and operatively connected, hollow agitators on said shafts within the trough, and means to supply heating or cooling fluid into said agitators through said shafts.

4. A mixing machine comprising a trough, an agitator shaft passing therethrough, means to tilt said trough about the axis of said shaft, a power-driven shaft, gearing connecting said power and agitator shafts, a tilting shaft at the rear of the machine, connections between said power and tilting shafts, including a clutch, manual driving means, connections therefrom to said tilting shaft, including a clutch, and a connection between said clutches whereby only one of them can be thrown in at a time.

5. A closure for a mixing trough, comprising an open box fitting on the top of the trough and having the same inside dimensions, means to attach the box to the trough, a heavy block slidably fitting within said box, and a cable to raise and lower said block, the top of the box having an internal flange to prevent the block from coming out of the box.

6. The combination with the trough of a mixing machine, of an open frame adapted to be secured to the top of the trough, a weight slidable within said frame, a cable supporting said weight, a hopper on the side of the frame and communicating with the inside of the latter through an opening at the bottom, and a rotary valve controlling such communication.

7. In a mixing machine, the combination with the frame provided with trunnion journals, of a trough mounted to swing about said journals, a rotary agitator mounted coaxially with said bearings, a shaft within said bearings, means to drive said shaft, an open box fitting the top of the trough, a top-frame secured to the machine frame, sheaves on said top-frame, counterbalance weights slidable in said top-frame, cables running over said sheaves and connecting said weights to said box, a block slidably fitted within said box, other sheaves on said top-frame, a winding drum on the machine frame, a cable connecting said block to said drum and running over said other sheaves, a hopper on each side of said box opening thereinto, and valves to control the outlets of said hoppers.

8. In a mixing machine, the combination of a tiltable trough, a rotary agitator within the same and removable means to close the open top of the trough while permitting the introduction of additional material, comprising a vertically movable frame adapted to be clamped on the trough, and a slidable weight within said frame, means to counterbalance said frame and means to raise and lower said weight, whereby a certain pressure is created within the trough, lateral hoppers on said frame communicating with the same through openings in the wall of the frame, covers for said hoppers, and manually controlled valves to close said openings.

9. In a mixing machine, the combination with a trough having a pair of bearings projecting from each end, hollow shafts journaled in said bearings, hollow agitators on said shafts within the trough, each agitator comprising two oppositely extending blades one concealed on one side and the other on the opposite side, means to tilt the trough about the axis of one of said shafts, means to supply steam into said last mentioned shaft, and a pipe connecting the ends of said shafts.

10. In a mixing machine, the combination with the trough of a hollow shaft journaled in the ends of said trough, and a hollow agitator on said shaft comprising two oppositely directed hollow wings or blades, concave on one side and convex on the other.

11. In a mixing machine having a tiltable trough, the combination therewith of a vertically movable closure for the trough, comprising an adjustable weight slidably fitted to the open top of the trough so as to create air pressure therein.

In testimony whereof I have hereunto set my hand.

CLIFFORD C. MOSHER.